United States Patent
Flury et al.

(10) Patent No.: US 9,673,997 B2
(45) Date of Patent: Jun. 6, 2017

(54) MANAGING A SYSTEM BETWEEN A TELECOMMUNICATIONS SYSTEM AND A SERVER

(75) Inventors: Thibaud Flury, Pontcharra (FR); Vincent Devin, Seyssinet (FR); Jérôme Pierson, Grenoble (FR)

(73) Assignee: France Telecom, Paris (FR)

( * ) Notice: Subject to any disclaimer, the term of this patent is extended or adjusted under 35 U.S.C. 154(b) by 1878 days.

(21) Appl. No.: 12/279,660

(22) PCT Filed: Jan. 31, 2007

(86) PCT No.: PCT/FR2007/000175
§ 371 (c)(1),
(2), (4) Date: Aug. 15, 2008

(87) PCT Pub. No.: WO2007/093684
PCT Pub. Date: Aug. 23, 2007

(65) Prior Publication Data
US 2009/0016329 A1  Jan. 15, 2009

(30) Foreign Application Priority Data
Feb. 15, 2006 (FR) ...................... 06 01323

(51) Int. Cl.
*H04L 12/66* (2006.01)
*H04L 12/58* (2006.01)
*H04L 29/08* (2006.01)

(52) U.S. Cl.
CPC ........ *H04L 12/581* (2013.01); *H04L 12/5835* (2013.01); *H04L 51/04* (2013.01); *H04L 51/066* (2013.01); *H04L 67/24* (2013.01)

(58) Field of Classification Search
CPC ....... H04W 4/02; H04W 76/00; H04W 4/025; H04L 67/12; H04L 67/18; H04L 51/04; H04L 51/063; H04L 51/066; H04L 12/581; H04L 12/5815; H04L 12/5835; H04M 1/72563; H04M 1/72569; H04M 1/72572; H04M 2250/12
USPC .................................. 370/352–356
See application file for complete search history.

(56) References Cited

U.S. PATENT DOCUMENTS

| | | | |
|---|---|---|---|
| 2002/0160819 A1* | 10/2002 | Daurensan | 455/567 |
| 2003/0023691 A1* | 1/2003 | Knauerhase | 709/206 |
| 2005/0021665 A1* | 1/2005 | Sekimoto et al. | 709/217 |
| 2005/0210148 A1* | 9/2005 | Kato et al. | 709/244 |

(Continued)

FOREIGN PATENT DOCUMENTS

| | | |
|---|---|---|
| EP | 1 139 608 | 10/2001 |
| WO | WO 01/69387 | 9/2001 |
| WO | WO 2005/094021 | 10/2005 |

*Primary Examiner* — Melanie Jagannathan
*Assistant Examiner* — Najeebuddin Ansari
(74) *Attorney, Agent, or Firm* — Cozen O'Connor

(57) ABSTRACT

A call is managed between a network and a telecommunications system (10) including a gateway (13), one or more interface devices (14-16) each of which can be connected to the gateway, and one or more sensors (17A, 17B) of information relating to the respective environments of the interface devices. The sensor senses information relating to the respective environments of the interface devices. Then, as a function of the sensed information, an interface device is selected. Finally, the selected interface device is connected with the gateway to enable a call between the selected interface device and the network.

10 Claims, 2 Drawing Sheets

(56) References Cited

U.S. PATENT DOCUMENTS

2006/0194589 A1* 8/2006 Sankisa ................. 455/456.1
2006/0215633 A1* 9/2006 Jennings et al. ............ 370/352
2006/0259958 A1* 11/2006 Jennings et al. ............... 726/6

* cited by examiner

MANAGING A SYSTEM BETWEEN A TELECOMMUNICATIONS SYSTEM AND A SERVER

RELATED APPLICATIONS

This is a U.S. national stage under 35 USC 371 of application No. PCT/FR2007/000175, filed on Dec. 20, 2006.

This application claims the priority of French patent application no. 06/1323 filed Feb. 15, 2006, the content of which is hereby incorporated by reference.

FIELD OF THE INVENTION

The present invention relates to telecommunications and more particularly to managing a call in a telecommunications network offering an 'instant messaging' service.

BACKGROUND OF THE INVENTION

In a telecommunications network offering an instant messaging (chat) service, for example, short text messages can be exchanged between users via respective graphical user interfaces of client terminals.

Some networks also offer exchange of voice messages via microphones and loudspeakers or exchange of multimedia messages via cameras, microphones, and screens.

In this type of network, an instant call can be set up between first and second client terminals of a server for managing exchange of data between the two terminals. In this kind of context, if a user of the first terminal wishes to move to another geographical location and to communicate with the second terminal via a third terminal located in that other geographical location, the call between the first and second terminals is interrupted and a new call is set up between the second and third terminals. This movement of the user therefore requires the user to log off at the first terminal and to log on at the third terminal.

The server generally maintains a database in which users' client terminals are associated with respective states that can represent the state of the user in relation to the instant messaging service, for example 'absent', 'logged on', 'logged off' or 'inactive'. A large or small number of states can be managed, depending on the type of service. Thus the server is able to inform a client terminal of the respective states of the other client terminals of the network.

The server keeps this database up-to-date and to this end stores changes of state of a client terminal.

Such changes of state can be implicit, i.e. managed automatically by the server as a function of parameters corresponding to the client terminal. For example, a client terminal can be placed in the 'logged off' state automatically by the server if the server cannot contact the terminal or if a relatively long period of inactivity of that client terminal has been detected.

Changes of state are generally explicit, however, i.e. requested explicitly by the user of the client terminal, and therefore require the user to perform an operation. For example, a client terminal can show its user a list of states managed by the server. Thus a user who is going away can select the 'absent' state, for example.

Furthermore, if a user has terminals of different types, such as a microphone, a loudspeaker or a screen, and wishes to change call type, in particular to change from a terminal having an audio output to a terminal having a graphical user interface, a manual operation is required of the user in order to log on at the terminal corresponding to the required call type.

Thus in networks offering a communications service, for example an instant messaging service, using a terminal generally requires the user to carry out many more or less complex manual operations, in particular in relation to managing movements of the user, the state of the client terminal, and the call type.

These operations by the user can be complicated and time-consuming and it is beneficial to make such client terminals more user friendly.

SUMMARY OF THE INVENTION

The present invention aims to alleviate the above drawbacks.

A first aspect of the present invention proposes a method of managing a call between a network and a telecommunications system including a gateway, a number of interface devices each of which can be connected to the gateway, and one or more sensors of information relating to the respective environments of said interface devices.

The method includes the following steps:

a) the sensor capturing information relating to sensory contexts in respective environments of the interface devices;

b) as a function of said information sensed, selecting one of the interface devices from the number of interface devices on the basis of a selection criterion;

c) connecting the selected interface device to the gateway to enable a call between the selected interface device and the network.

This kind of telecommunications system therefore manages a call with a network automatically as a function of information sensed by the sensor.

In this context, the step of selecting the interface device generally adapts the user interface of the system as a function of the environment of the user.

To enable efficient use, this kind of system can be adapted automatically on the basis of the information sensed.

In one embodiment of the present invention, the information sensed includes information relating to the location of a user in the respective environments of the interface devices.

For example, when first information is sensed and the user moves, manual reconnection by the user may not be required.

The following steps can be executed following selection of an interface device:

determining a state of the telecommunications system as a function of one or more characteristics of the selected interface device; and transmitting the state of the system to the network.

Thus this state can also be determined automatically. A manual operation by the user is no longer required. For example, the absence of the user can be detected on the basis of the information sensed and the 'absent' state notified to the network. In this situation, a server in the network is generally responsible for receiving state-related information. Thus the call between the network and the telecommunications system can correspond to a call between the server and the telecommunications system.

Levels of accessibility of the interface devices to the user can be determined from information relating to the respective locations of the interface devices of the system. Under such circumstances, the interface device can be selected on the basis of a first selection criterion corresponding to the highest level of accessibility. Thus the user interface that is geographically suitable for the user can advantageously be selected automatically.

Respective quality levels of the sensory contexts associated with the interface devices can also be determined on the basis of information relating to sensory contexts. In this situation, the interface device can be selected on the basis of a second selection criterion corresponding to the highest quality level. An interface suited to the sensory environment of the various interface devices of the system can then be selected.

After the step c, the following steps can be carried out:
the sensor receiving new information relating to the respective environments of the interface devices;
selecting another interface device if, given said new information, the selected interface device no longer satisfies the selection criterion;
if necessary, determining a new state of the telecommunications system as a function of one or more characteristics of said other interface device selected and sending said new state of the system to the network.

In one embodiment of the present invention this enables the telecommunications system to adapt as a function of changes in the sensed information. Advantageously, the system can therefore adapt automatically "on the fly" as a function of changes sensed by one or more sensors.

When data is received by the gateway in a first communication mode and the selected interface device is adapted to communicate in a second communication mode, the data received in the first communication mode is converted into data according to the second communication mode. Thus a conversion function is used in the system conforming to one embodiment of the invention and the exchange of messages between the gateway and the network can therefore remain unchanged. Thus any interface device can be adapted to operate in a system of this kind conforming to one embodiment of the present invention and communicate with any other type of server in the network.

A characteristic of the selected interface device can advantageously be controlled as a function of information relating to the respective environments of the interface devices. For example, if the selected interface device is a screen and the second information sensed indicates that the screen is exposed to a very high level of brightness, it is then possible to control a characteristic linked to adjusting the contrast of the screen to make reading it more comfortable for the user. In such situations, it is also possible to decide to select another interface device.

The call between the telecommunications system and the server can be a call between the telecommunications system and a server of said network, the gateway then being a client of said server.

A second aspect of the present invention proposes a supervisory entity in the telecommunications system. That supervisory entity includes:
a first interface unit adapted to receive the information relating to the respective environments of the interface devices;
a selection unit adapted to select one of the interface devices from the number of interface devices;
a second interface unit adapted to communicate with the selected interface device to connect it to the gateway; and
a third interface unit adapted to communicate with the gateway.

This supervisory entity can further include a determination unit adapted to determine a state associated with the telecommunications system as a function of one or more characteristics of the selected interface device, the first interface unit being adapted to transmit the state so determined to the gateway.

When the information relating to the respective environments of the interface devices includes first information relating to the location of a user in the respective environments of the interface devices, the selection unit can be adapted to determine levels of accessibility of the interface devices to the user from the location-related first information. Under such circumstances, the interface device can be selected on the basis of a first selection criterion corresponding to the highest level of accessibility.

When the information relating to the respective environments of the interface devices includes second information relating to the sensory contexts in the respective environments of the interface devices, the selection unit can also be adapted to determine respective quality levels of the sensory contexts associated with the interface devices from the second information. Under such circumstances, the interface device can be selected on the basis of a second selection criterion corresponding to the highest quality level.

The first interface unit can for example receive second information indicating background noise levels and/or brightness levels relating to the respective interface devices of the telecommunications system.

This supervisory entity can further include a control unit adapted to control one or more characteristics of the selected interface device as a function of information relating to the respective environments of the interface devices.

A third aspect of the present invention proposes a gateway in the telecommunications system, the gateway including:
a first interface unit adapted to communicate with the network; and
a second interface unit adapted to communicate with one or more interface devices from the number of interface devices as a function of sensed information.

A fourth aspect of the present invention proposes an interface device in the telecommunications system, the interface device including:
a first interface unit adapted to receive a command for connection between the interface device and the gateway; and
a second interface unit adapted to connect the interface device to the gateway on reception of the command and then to communicate with the network via the gateway.

A fifth aspect of the present invention proposes a telecommunications system including:
a gateway according to the third aspect of the present invention;
a number of interface devices according to the fourth aspect of the present invention;
one or more sensors of information relating to the respective environments of the interface devices; and
a supervisory entity according to the second aspect of the present invention.

A sixth aspect of the present invention proposes a computer program intended to be installed in a supervisory entity and including instructions adapted to execute a method according to the first aspect of the present invention on execution of the program by processor means of the supervisory entity according to the second aspect of the present invention.

A seventh aspect of the present invention proposes a computer-readable storage medium storing the computer program according to the sixth aspect of the present invention.

DETAILED DESCRIPTION OF THE DRAWINGS

DETAILED DESCRIPTION OF THE DRAWINGS

Figure 1:
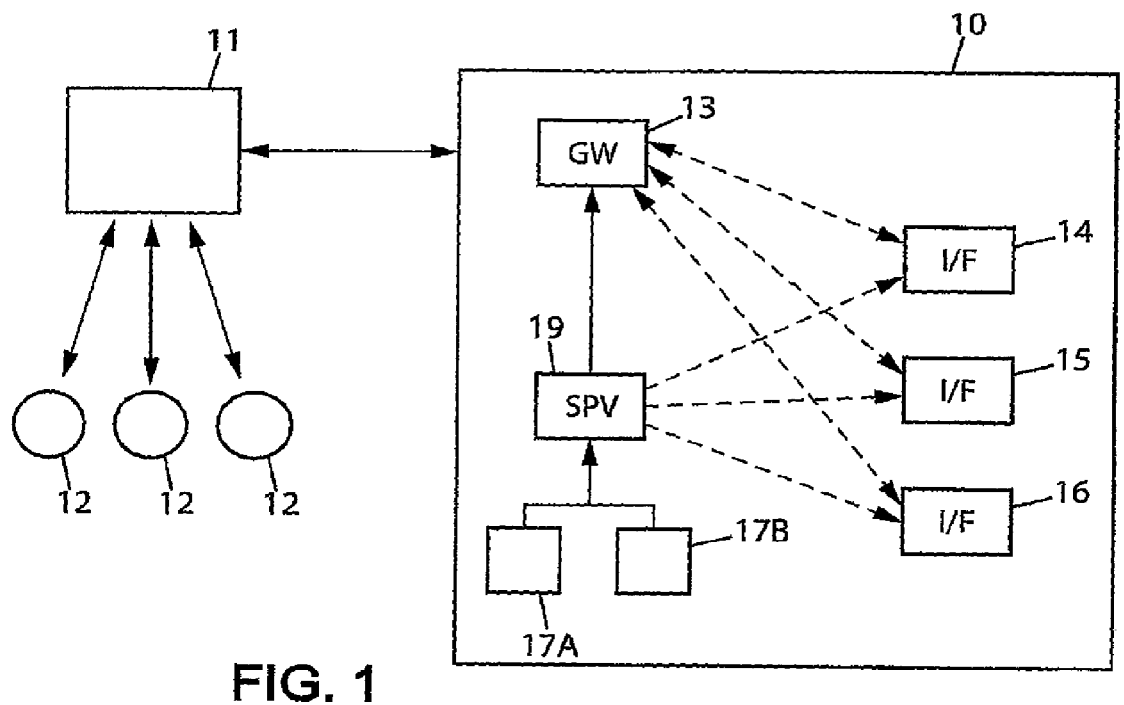
FIG. 1 shows one embodiment of a telecommunications network of the present invention.

One object of the present invention is to propose a telecommunications system that is easy to use, based on automatic adaptation of the interfaces offered to a user via different terminals as a function of environmental characteristics relating to the user and the terminals.

In one architecture of the present invention, a client telecommunications system includes client terminals of the same user.

Below, a client terminal corresponds to an interface device offering the user one or more interfaces. An interface device can in particular be a screen, a keyboard, a loudspeaker, a microphone or a camera, or any combination of such interface devices.

The present invention is described by way of example below in an application to a client telecommunications system of an instant messaging server. However, it should be noted that no limitation is implied by this type of communications service. Thus it is easy to adapt the following description to any other type of telecommunications service in which a client system having a number of interface devices communicates with one or more client terminals external to the telecommunications system via a telecommunications service server.

One objective of the present invention is to select, as a function of ambient information sensed by one or more sensors of the telecommunications system, one or more interface devices from a number of interface devices of the client telecommunications system in order to use the selected interface device for communication by the user.

No limitation is implied by the type of information sensed to enable selection of the relevant interface device. Furthermore, no limitation is implied by the number of interface devices that can be selected for communication by the user of a client telecommunications system conforming to one embodiment of the present invention or even to the number of sensors that such a system includes.

In one embodiment of the present invention, the sensors of the system are adapted to sense information relating to the respective environments of the interface devices 14-16. Here that information includes first information relating to the location of the user in the respective environments of the interface devices 14-16 of the system 10 and second information relating to the sensory contexts in the respective environments of the interface devices 14-16.

Thus the first information is used to evaluate a distance between the user and the various interface devices of the system. On the basis of such information, the selected interface device preferably corresponds to that which is most accessible from the user's location. The client telecommunications system is then able to adapt automatically to movement of the user in the space in which the system is installed.

The second sensed information characterizes the sensory context of each of the interface devices. The expression "sensory context" associated with an interface device refers to the ambient context in the environment of that interface device, defined by a sensory parameter (ambient light level, background noise level, etc.,), the environment of the interface device considered corresponding to the area in which the user could communicate via that interface device. Thus for a screen interface device, the second information can correspond to the brightness level to which the screen is exposed. Under such circumstances, if the client system offers two screens for communicating, the screen exposed to the lower brightness level is preferably selected. The second information relating to an interface device equipped with a sound output can correspond to a sound level captured in the vicinity of that sound output. Thus if the client system offers two interface devices with sound output, the device having the lower captured sound level is preferably selected.

The information sensed by the sensors can be aggregated and interpreted to determine among other things sensory context and location characteristics from which an interface device can be selected in accordance with the invention.

The steps of aggregating and interpreting this information are not part of the present invention. Systems for carrying them out are well known to the person skilled in the art.

Another objective of the present invention is to use a communication mode selected from a number of communication modes offered in the client system via the plurality of interface devices, such selection being based on the user's ambient communication context. The expression "communication mode" refers to the various communication techniques, such as audio or visual communication or a combination of audio and visual communication. This term also refers to the possibility of communicating in sending and/or receiving mode.

Thus in the context of instant messaging, it can be advantageous to select an interface device offering a sound output rather than a graphical interface device or screen if the second information sensed indicates that the screen is exposed to bright light and is therefore difficult for the user to read, whereas no background noise is detected at the sound interface device.

Consequently, a user can use a telephone, for example, whereas the other party uses a client terminal with a keyboard and a screen in the standard way. Data corresponding to the text received from the other party is then converted into data corresponding to a sound output.

If the user responds vocally to an audio message received, then their speech is converted into a format corresponding to the text to be displayed, for example on the screen of the terminal of the other party. A conversion function is therefore advantageously provided in the client system conforming to one embodiment of the present invention.

FIG. 1 shows an architecture of one embodiment of a telecommunications system of the present invention and a network offering a telecommunications service to which this kind of telecommunications system can be connected.

A client telecommunications system 10 can communicate with other client terminals 12 via an instant messaging server 11 in the network concerned. The telecommunications system 10 includes interface devices 14-16 each of which offers means for calls via the server 11 between a user of the client system 10 and a user of a client terminal 12.

The client system 10 also includes sensors 17A adapted to sense location information and sensors 17B adapted to sense sensory context information. The function of these sensors 17A and 17B is to sense information relating to the environment of the interface devices 14-16. Here, the sensors 17A sense first location information of a user in the respective environments of the interface devices 14-16 and the sensors 17B sense information relating to their sensory contexts, which are defined by sensory parameters (here brightness and sound level) in the respective environments of the interface devices 14-16.

The steps of centralizing, aggregating, and interpreting sensed information can be carried out in a central supervisory entity 19 that is also adapted:

to select one of the three interface devices 14-16 as a function of the processing of the sensed information; and to connect the selected interface device to a client gateway 13, which here is integrated into the client system 10, to set up a call between the selected interface device and the server 11.

Figure 2:
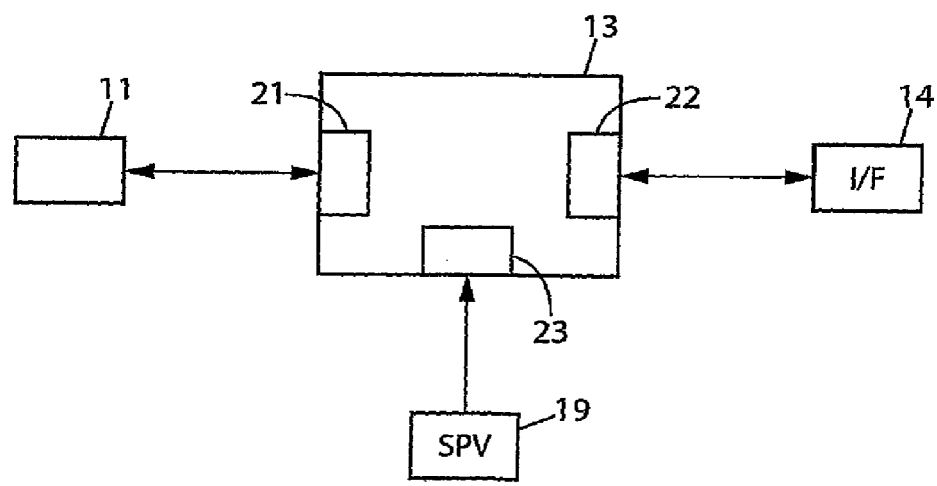
FIG. 2 shows a functional architecture of one embodiment of a gateway of the present invention.

FIG. 2 shows a functional architecture of one embodiment of the gateway 13 of the present invention. The client gateway 13 represents the interface of the client system 10 with the server 11.

In one embodiment of the present invention, the gateway 13 is adapted to manage exchange of messages with the server 11 in accordance with a common protocol so that use of the present invention does not lead to any modifications in the server 11.

This kind of gateway 13 therefore has a first interface 21 adapted to receive, respectively send, a message from, respectively to, another client terminal 12 via the server 11. It is also adapted to receive from the server 11 a notification of a change of state of another client terminal 12 and, conversely, to notify the server 11 of a change of state of the system 10 conforming to one embodiment of the present invention.

If the system 10 proposes a list of states including not only the 'standard' states as defined by the protocol used between the clients and the server 11 but also other, new, states managed by the client system 10 according to one embodiment of the present invention, the gateway 13 is then capable of transmitting those other 'non-standard' states.

These non-standard new states can, for example, be appended to the standard states known to the server 11 using a particular comment syntax, and can therefore be transmitted in association with said standard states from the gateway 13 to the server 11. For example, the 'absent' state can be associated with a comment indicating a reason for absence, such as 'gone to lunch'.

This kind of syntax advantageously increases the number of possible states of the client system 10 in one embodiment and enriches the information conveyed by the change of state notifications.

This gateway 13 also has a second interface 22 adapted to exchange messages with the interface device(s) 14-16 that have been selected and are logged onto the gateway 13. Thus the interface device(s) 14-16 can transmit messages to the clients 12 via the gateway 13 and can receive messages and states from those clients 12, also via the gateway 13.

The gateway 13 has a third interface 23 for receiving messages from the supervisory entity 19. When the supervisory entity 19 determines a new state for the telecommunications system 10, it transmits it to the gateway 13 so that the change of state is sent to the server 11 in the network.

Moreover, in one embodiment of the present invention, the gateway 13 is adapted to maintain a history of the current calls of the user of the system 10. This history can, for example, enable consultation of the text of messages sent and received, the identity and status of the other parties, and a local time reference of messages sent and received.

In one embodiment of the present invention, because the gateway 13 is independent of the interface devices 14-16, it can be located anywhere in the network.

The interface devices 14-16 can be adapted to manage an instant messaging protocol to exchange messages with the server 11 via the gateway 13. A standard interface device can then be used in the client system 10 conforming to one embodiment of the present invention.

However, if a first communications protocol is used between the gateway 13 and the server 11, a second protocol, different from the first, can be used between the gateway 13 and the selected interface device(s). The gateway 13 can then be responsible for converting between the first and second protocols.

Thus in a client system 10 according to the invention no limitation is implied by the interface device type.

An interface device can, for example, consist of loudspeakers that reproduce received messages by voice synthesis or a single lamp the intensity of which increases with the number of unread messages.

The interface devices of a system 10 of one embodiment of the present invention are preferably in the space in which the user is likely to move around.

Thus this kind of telecommunications system can advantageously be implemented in the user's home. For example, there can be a first screen in a first room of the home and second and third screens in a second room.

Location and brightness level sensors are appropriately arranged in the vicinity of these three screens.

If the user is in the first room, they can receive messages on the first screen from a client terminal 12 and via the server 11. If the user moves to the second room, the location sensors sense this and transmit the sensed information to the supervisory entity 19, which then decides to select another screen satisfying selection criteria linked to the new location of the user relative to the selected device.

This supervisory entity 19 then selects one of the second and third screens situated in the second room where the user is presently located. To this end, the supervisory entity 19 can take account of the second information supplied by the sensors, i.e. the information relating to the respective sensory contexts of the screens. Thus the supervisory entity 19 can select the screen exposed to the lowest brightness level.

For example, in this kind of implementation of the selection step, location criteria are considered before sensory context characteristics.

By means of such provisions, the interface devices 14-16 can be connected to and disconnected from the gateway 13 dynamically and automatically.

This kind of client telecommunications system 10 can be adapted to be used by a number of users. The location sensors can then be adapted to sense different location information for respective users.

The system can also include a communication mode conversion function for converting one communication mode, for example voice communication, into another communication mode, for example graphical communication. Such function can be either centralized or distributed in the client telecommunications system. If distributed, the function can be located in some or all of the interface devices 14-16 of the system 10.

For example, loudspeakers can reproduce for the user in spoken form messages received in text form. These loudspeakers can also recite in spoken form the record of previous conversations.

The supervisory entity 19 is in charge of adapting the messaging service as a function of the location of the user and the sensory context as defined above.

Figure 3:
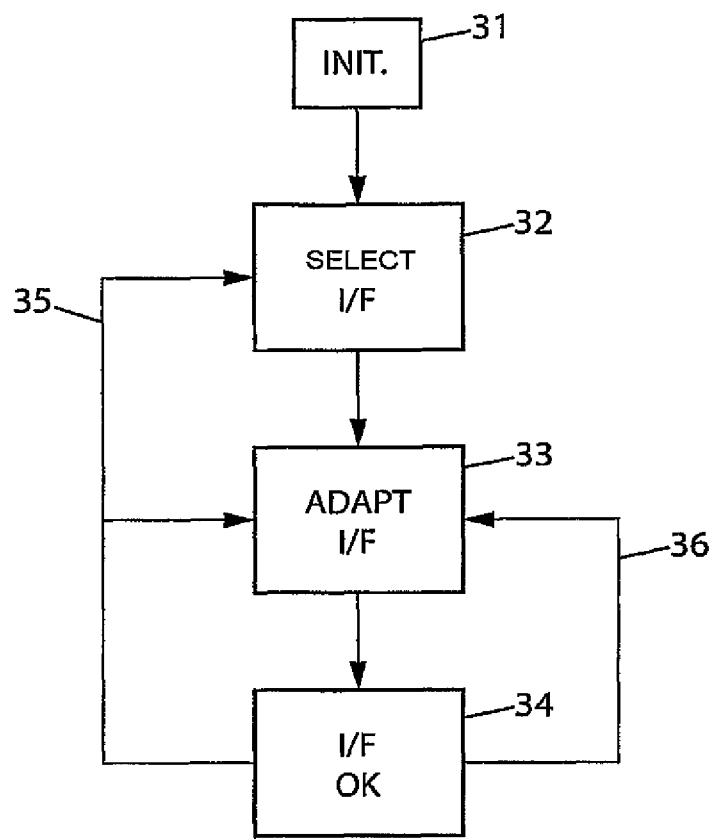
FIG. 3 shows main steps of one embodiment of a call management method of the present invention.

FIG. 3 shows the main steps of a method of the present invention.

In one embodiment of the present invention, in an initialization step 31, the supervisory entity 19 attempts to connect to the sensors of the system, sources of context and location information, to be advised of modifications concerning the user and their respective sensory contexts.

The supervisory entity 19 then initializes the gateway 13 to represent the user in the instant messaging network. The supervisory entity can then authenticate the user with the server 11 in order to connect the gateway 13 to the server 11.

In a step 32, the supervisory entity 19 can then select one or more interface devices to be connected to the gateway 13 for communication of the user of the client system 10 with the server 11. To this end, it can be advantageous to make a selection of this kind as a function of distance or of the geographical location of the user relative to the various interface devices 14-16. The architecture of the geographical location is preferably also taken into account to encourage the selection of the device that is the easiest one for the user to access. Then, if a number of interface devices substantially meet the location criteria based on the accessibility of the interface devices to the user, the supervisory entity can advantageously take into account the sensed second information to select the most suitable one of the interface devices that are easily accessible to the user.

The supervisory entity 19 then connects the selected interface device or devices to the gateway 13.

After selecting an interface device, in the step 33, the supervisory entity 19 determines a state of the user as a function in particular of the type of the selected interface device. For example, if a screen is selected, but no keyboard or interface device for sending messages is selected, the state associated with the system can be 'read only', indicating that the user can only read received messages.

The supervisory entity 19 then indicates this state of the client system 10 to the gateway 13, which sends it to the server 11. It can also indicate it to the selected interface device or devices connected to the gateway 13.

In this step, the supervisory entity 19 can furthermore control adaptation of a characteristic of the selected interface device as a function of information relating to its sensory context. For example, if loudspeakers that reproduce messages to the user in synthesized speech form are selected as the interface device and a background noise level above a threshold level is detected in the immediate environment of the loudspeakers, the supervisory entity 19 can command the interface device to increase the volume at which messages are reproduced. The distance between the user and the loudspeakers can also be taken into account for this.

Alternatively, the supervisory entity 19 can cause the reproduction of received messages to be delayed. There can then be provision for the clients of the server 11 to be informed of the delay.

The same kind of management by the supervisory entity 19 can be implemented if the interface device is a screen that is exposed to such a high brightness level that it cannot be read by the user.

The supervisory entity 19 can also receive from the sensors information indicating the presence of a new person approaching the interface device selected for the call. On receiving this information, the supervisory entity 19 can decide to inform the other clients 12 of the server 11 of this fact.

Moreover, in order to preserve the privacy of the call, the history of old messages can be concealed and transmission of new messages interrupted, i.e. the loudspeakers can be turned off or the screen can be switched to standby mode. The other clients 12 can also be informed of these conditions by notification of a new state indicating this kind of situation.

In the step 34, the selected interface device can communicate with the instant messaging service network.

In one embodiment of the present invention, if the sensor 17A informs the supervisory entity 19 of a change of location, there can be provision for returning either to the step 32 or to the step 33 in the succession of steps described above. For example, if the user goes from a room in which the current interface device is located is on a call to another room in which there is another interface device that has not logged onto to the gateway 13, it may be preferable to select that other interface device. In contrast, if the room in which the user is presently located does not contain an interface device, it may be advantageous to retain the current interface device and to seek to adapt one or more characteristics of the current selected interface device to enhance the call. Thus when the interface device has an audio output, the supervisory entity can request the device to increase the volume for reproducing received messages so that the user can receive messages even when moving around.

For the selection step, the supervisory entity can take into consideration device selection criteria relating to the physical proximity of the user to the devices, or to be more accurate criteria relating to the user's access to the various interface devices. If only the physical proximity criterion is taken into account, an interface device could then be selected although it is separated from the user by a wall as it is situated in another room.

This kind of selection step can also take into account a criterion relating to the availability of the interface devices. It would seem advantageous not to select a device that is already in use.

Varied criteria can be considered as a basis for selecting an interface device.

Then, during operation of the telecommunications system 10, if the sensory context of the interface device and/or the location of the user changes, the supervisory entity 19 receives sensed information indicating those changes. At this stage it can effect a new interface device selection step and then determine the current state of the system 10 after the latest selection and inform the server 11 via the gateway 13 of this new state of the client system 10.

Figure 4:
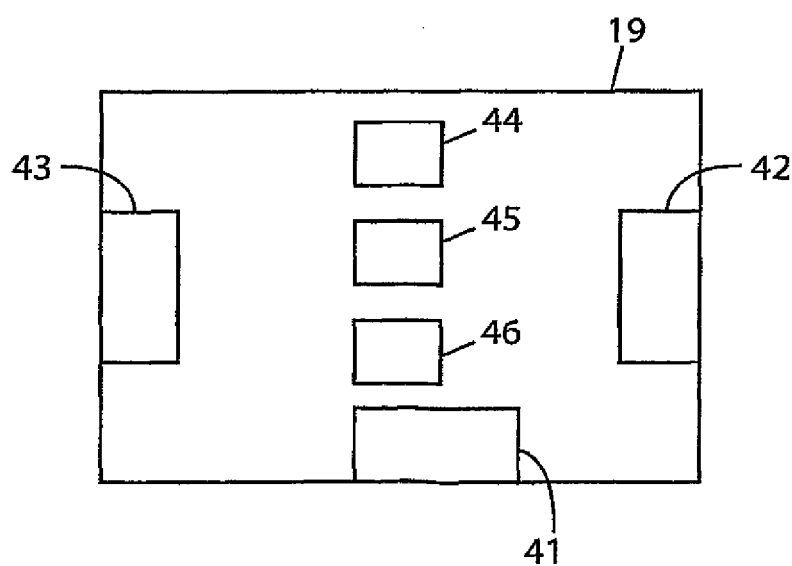
FIG. 4 shows an architecture of one embodiment of a supervisory entity of the present invention.

FIG. 4 shows an architecture of a supervisory entity 19 including a first interface unit 41 adapted to receive information relating to the respective environments of the interface devices or, in one embodiment of the present invention, the first and/or second information from the sensor. It also includes a selection unit 44 adapted to select an interface device from a number of interface devices. It further includes a second interface unit 42 adapted to communicate with the selected interface device to connect it to the gateway 13.

A third interface unit 43 is adapted to communicate with the gateway 13. Moreover, a determination unit 45 is adapted to determine automatically a state associated with the telecommunications system 10 as a function of at least one characteristic of the selected interface device and the first interface unit 41 is then adapted to transmit the determined state to the gateway 13. Moreover, a control unit 46 is adapted to control at least one characteristic of the selected interface device as a function of the first and/or second information.

A client telecommunications system 10 of this kind in particular enables automatic management of the adaptation of a call as a function of information sensed in the user's environment. It also determines automatically a change of state of the system to be transmitted to a server, in particular an instant messaging server. An embodiment of the present invention is easy to implement in a network offering an existing instant messaging service, in particular because the interface of such a system with the server can be similar to an interface of an existing client terminal with the server.

The invention claimed is:

1. A method of managing a call between a network and a telecommunications system including a gateway connecting said telecommunications system and said network, a number of interface devices of a first user, each of which can be connected to said gateway, and one or more sensors of information relating to respective environments of said interface devices of the first user; said method including the steps of:
capturing with the one or more sensors first information relating to a location of the first user in the respective environments of the interface devices of the first user and second information relating to an ambient context of the respective environments of the interface devices of the first user;
determining levels of accessibility of the interface devices of the first user based on the location of the first user relative to respective locations of the interface devices of the first user;
determining a quality level of the ambient contexts of the interface devices of the first user from the second information;
selecting one of the interface devices of the first user on the basis of a first selection criterion, corresponding to the highest level of accessibility and of a second selection criterion, corresponding to the highest level of quality; and
connecting the selected interface device of the first user to the gateway to enable a call between the selected interface device and the network,
wherein, if data is received by the gateway in a first call mode and the interface device selected is adapted to communicate in a second call mode, said data received in the first call mode is converted into data in the second call mode.

2. A call management method according to claim 1, further including the following steps, following selection of an interface device:
determining a state of the telecommunications system as a function of one or more characteristics of the selected interface device; and
transmitting said state of the system to the network.

3. A call management method according to claim 1, further including, after connecting the selected interface device, the steps of:
the one or more sensors receiving new information relating to the respective environments of the interface devices;
selecting another interface device if the selection criterion is no longer satisfied by the interface device selected given the new information; and
where appropriate, determining a new state of the telecommunications system as a function of one or more characteristics of said other interface device selected and transmitting said new state of the system to the network.

4. A call management method according to claim 1, wherein, if data is received by the gateway in a first call mode and the interface device selected is adapted to communicate in a second call mode, said data received in the first call mode is converted into data in the second call mode.

5. A call management method according to claim 1, wherein one or more characteristics of the selected interface device is controlled as a function of information relating to the respective environments of the interface devices.

6. A call management method according to claim 1, wherein the call between the telecommunications system and the network is a call between the telecommunications system and a server of said network and the gateway is a client of said server.

7. A supervisory entity in a telecommunications system adapted to manage a call with a network, said telecommunications system including a gateway, a number of interface devices of a first user, each of which can be connected to said gateway, and one or more sensors for capturing first information relating to a location of the first user in respective environments of the interface devices of the first user and second information relating to an ambient context of the respective environments of the interface devices of the first user, said supervisory entity comprising:
a first interface unit adapted to receive the first and second information from the one or more sensors;
a first determining unit adapted to determine levels of accessibility of the interface devices of the first user based on the location of the first user relative to respective locations of the interface devices of the first user:
a second determining unit adapted to determine a quality level of the ambient contexts of the interface devices of the first user from the second information;
a selection unit adapted to select one of the interface devices of the first user on the basis of a first selection criterion, corresponding to the highest level of accessibility and of a second selection criterion, corresponding to the highest level of quality;
a second interface unit adapted to communicate with the selected interface device of the first user to connect it to said gateway; and
a third interface unit adapted to communicate with the gateway,
wherein, if data is received by the gateway in a first call mode and the interface device selected is adapted to communicate in a second call mode, said data received in the first call mode is converted into data in the second call mode.

8. A supervisory entity according to claim 7, further including a determination unit adapted to determine a state associated with the telecommunications system as a function of one or more characteristics of the selected interface device, the first interface unit being adapted to transmit the determined state to the gateway.

9. A telecommunications system adapted to manage a call with a network, including:
a gateway including a first interface unit adapted to communicate with the network and a second interface unit adapted to communicate with one or more interface devices selected from a number of interface devices as a function of sensed information;
a number of interface devices each including a first interface unit adapted to receive a command to connect said interface device and the gateway, a second interface unit adapted to be connected to said gateway and, on reception of said command, to connect said interface device to the gateway and then to communicate with the network via the gateway;

one or more sensors of information relating to the respective environments of the interface devices; and a supervisory entity comprising:
- a first interface unit adapted to receive the first and second information from the one or more sensors;
- a first determining unit adapted to determine levels of accessibility of the interface devices of the first user based on the location of the first user relative to respective locations of the interface devices of the first user;
- a second determining unit adapted to determine a quality level of the ambient contexts of the interface devices of the first user from the second information;
- a selection unit adapted to select one of the interface devices of the first user on the basis of a first selection criterion, corresponding to the highest level of accessibility and of a second selection criterion, corresponding to the highest level of quality:
- a second interface unit adapted to communicate with the selected interface device of the first user to connect it to said gateway; and
- a third interface unit adapted to communicate with the gateway, wherein, if data is received by the gateway in a first call mode and the interface device selected is adapted to communicate in a second call mode, said data received in the first call mode is converted into data in the second call mode.

10. A non-transitory computer-readable storage medium storing a computer program intended to be installed in a supervisory entity, including instructions for executing a method upon execution of the program by processor means of the supervisory entity in a telecommunications system adapted to manage a call with a network, said telecommunications system including a gateway, a number of interface devices each of which can be connected to said gateway, and one or more sensors for capturing information relating to sensory contexts in respective environments of the interface devices, said method comprising:

capturing with the one or more sensors first information relating to a location of the first user in the respective environments of the interface devices of the first user and second information relating to an ambient context of the respective environments of the interface devices of the first user:

determining levels of accessibility of the interface devices of the first user based on the location of the first user relative to respective locations of the interface devices of the first user:

determining a quality level of the ambient contexts of the interface devices of the first user from the second information:

selecting one of the interface devices of the first user on the basis of a first selection criterion, corresponding to the highest level of accessibility and of a second selection criterion, corresponding to the highest level of quality: and connecting the selected interface device of the first user to the gateway to enable a call between the selected interface device and the network, wherein, if data is received by the gateway in a first call mode and the interface device selected is adapted to communicate in a second call mode, said data received in the first call mode is converted into data in the second call mode.

* * * * *